United States Patent Office 2,789,112
Patented Apr. 16, 1957

2,789,112
N-OXIDES OF DESERPIDATES

William Irving Taylor, Summit, N. J., assignor to Ciba Pharmaceutical Products, Inc., Summit, N. J., a corporation of New Jersey No Drawing. Application December 27, 1955,
Serial No. 555,318

12 Claims. (Cl. 260—286)

This application is a continuation-in-part of my copending application Serial No. 536,287, filed September 23, 1955, now abandoned.

This invention relates to a new series of organic pentacyclic compounds. More particularly, it concerns N-oxides of alcohol esters of deserpidic acid in which the hydroxyl group of deserpidic acid is esterified, the salts thereof and a process for their preparation.

I have shown in my copending application, Serial No. 536,288, filed September 23, 1955, now abandoned, that componds having the nucleus of reserpine i. e.

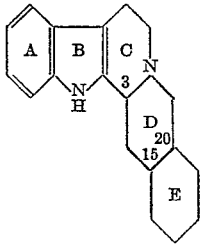

and having at least one substituent in ring E and the stereo-configuration of reserpine in positions 3, 15 and 20 are converted by treatment with N-oxidizing agents, such as peracids, into the corresponding N-oxides.

I have now found that when this reaction is applied to the alcohol esters of deserpidic acid in which the hydroxyl group of deserpidic acid is esterified with acids, for example organic carboxylic or sulfonic acids, a series of useful N-oxides are obtained. These N-oxides and the salts thereof possess pronounced sedative activity and can be used as medicaments for the treatment of states of nervousness, anxiety, tension and mental disorders.

The esterifying acids may be carboxylic or sulfonic acids of the aliphatic, araliphatic, aromatic or heterocyclic series. Suitable sulfonic acids are for example p-toluene sulfonic acid or benzene sulfonic acid.

Quite valuable with respect to their sedative activity are the N-oxides of lower alkyl deserpidates the hydroxyl groups of which are esterified with carboxylic acids of the aliphatic series such as for example lower alkane carboxylic acids, preferably acetic acid. Also valuable are the N-oxides of lower alkyl deserpidates which are esterified with aromatic or araliphatic carboxylic acids containing a phenyl radical which is advantageously substituted, preferably at least in 4-position, by etherified hydroxyl groups, especially lower alkoxy groups such as methoxy or a methylene dioxy group. Such acids are, for example, benzoic acid, phenyl acetic acid or cinnamic acid, 3,4,5-trimethoxy-benzoic acid, 3,4-dimethoxy-benzoic acid, 3,4-methylenedioxy-benzoic acid, 3,4,5-triethoxy-benzoic acid, 4-methoxy-benzoic acid; O-carbalkoxy-syringic acids, such as O-carbethoxy-syringic acid, and 3,4,5-trimethoxy-cinnamic acid.

Additional examples of acids with which the hydroxyl group of the lower alkyl deserpidate N-oxides may be esterified, are the monocyclic, monoheterocyclic acids such as furane carboxylic acids, e. g. furane-2-carboxylic acid, pyridine carboxylic acids e. g. nicotinic acid or thiophene carboxylic acids; mandelic and tropic acids.

Especially valuable with respect to their sedative activity are the N-oxides of methyl O-(3,4,5-trimethoxybenzoyl)-deserpidate, methyl O-(3,4-methylenedioxy-benzoyl)-deserpidate, methyl O-(3,4-dimethoxybenzoyl)-deserpidate, methyl O-(3,4,5-trimethoxycinnamoyl)-deserpidate, methyl O-(3,4,5-triethoxybenzoyl)-deserpidate, ethyl O-(3,4,5-trimethoxybenzoyl)-deserpidate, methyl O-furoyl-(2)-deserpidate, methyl O-nicotinoyl-deserpidate, methyl O-acetyl-deserpidate and methyl O-(O'-carbethoxy-syringoyl)-deserpidate and the like.

N-oxidation of the deserpidic acid esters to the new compounds can be carried out with an N-oxidizing agent such as ozone. It is, however, much more convenient and effective to use inorganic or organic peracids, such as monopersulfuric acid, p-toluene persulfonic acid, peracetic acid, monoperphthalic acid, etc. I have noted that the reaction proceeds in a most advantageous manner and with particularly good yields when perbenzoic acids, such as perbenzoic acid itself are used. As diluents, benzene, toluene, ethylene dichloride, chloroform, ethyl acetate or similar solvents may be employed. It is of advantage to avoid an excess of oxidizing agents and raised temperatures in order to prevent further oxidation of the molecule.

The starting materials for the oxidation may be used in the form of free bases or as salts thereof. Depending on the working conditions employed, the final N-oxides may be isolated as free compounds or, especially if peracids are used, in the form of their salts. The free compounds may be converted into their acid addition salts in the usual manner by the addition of acids. These salts in turn may be converted into the free bases e. g. by the action of alkali. As salts there are contemplated the therapeutically useful non-toxic acid addition salts such as the salts with hydrohalic acids, sulfuric acid, phosphoric acid, nitric acid, hydroxyethane sulfonic acid, toluene sulfonic acid, acetic acid, tartaric acid or citric acid and the like.

For therapeutic use, e. g. for inducing sedation, the new compounds or their salts may be formulated into pharmaceutical compositions with a pharmaceutical adjuvant as a carrier. The compositions may be in any suitable solid or liquid dosage form, especially in a form suitable for oral or parenteral administration, e. g. tablets, powder, capsules, pills, solutions, emulsions or suspensions, e. g. in the form of injectable solutions. As pharmaceutical carriers there may be employed materials which do not react with the new compounds and are therapeutically useful, such as water, gelatine, lactose, starch, magnesium stearate, talc, vegetable oils, benzyl alcohol, ascorbic acid, gums, glycols such as propylene glycol or poly-alkylene glycol, petroleum jelly, cholesterol, tragacanth, alcohol or mixtures thereof. The new compounds are administrable in amounts ranging from about 0.1 mg. to about 100 mg., preferably from about 0.2 mg. to about 20 mg. per dosage unit.

In preparing the novel compositions the new compounds are admixed with the pharmaceutical carrier and formulated in the desired dosage unit form according to pharmaceutical practice. The compositions may be sterilized and may contain auxiliary substances such as preservative, stabilizing, wetting or emulsifying substances, salts for the control of the osmotic pressure or buffer substances or besides the new compounds other therapeutically active substances, for example such as are used in combination with reserpine.

The new esters are also useful as intermediates for the preparation of other valuable compounds. Thus they may be completely or partially saponified to desperpidic acid N-oxide or alcohol esters of deserpidic acid N-oxide respectively. To effect this, one may work with the same or different alkaline saponifying agents depending upon the working conditions, as for example the presence or absence of water, a lower or higher temperature or a longer or shorter reaction time. For example, when a diester is heated for a comparatively long time with the solution of an alkali hydroxide, such as potassium hydroxide, in an alcohol, such as methanol, both ester groups are hydrolyzed. When the treatment is performed with the same agent under milder conditions, e. g. for a short time, only the esterified hydroxyl group is split.

For partial saponification there is used as an alkaline saponifying agent advantageously one capable of converting an esterified hydroxyl group into a free hydroxyl group with the formation of an ester, that is to say, by alcoholysis, the carbomethoxy group being re-esterified, depending on the conditions employed. It is thus of advantage to work in an anhydrous alcohol in the presence of an alcoholate, such as an alkali metal or aluminum alcoholate or a similar alcoholyzing agent, for example sodium carbonate or piperidine. In absolute methanol in the presence of an alkali methylate such as sodium methylate, aluminum tertiary butylate, piperidine, or sodium carbonate, there is formed the deserpidic acid methyl ester N-oxide. When the alcoholysis is carried out in other absolute alcohols, such as ethanol or butanol in the presence, for example, of the corresponding alcoholate, such as sodium ethylate or sodium butylate or other alcoholyzing agents there are obtained by reesterification the corresponding N-oxidized deserpidic acid esters, such as deserpidic acid ethyl ester or butyl ester N-oxide, respectively. The products of this process are isolated by known methods. For conversion into deserpidic acid N-oxide the esters can further be treated in an alkaline hydrolyzing medium, e. g. with an alcoholic solution of an alkali hydroxide such as a methanolic solution of potassium hydroxide. Deserpidic acid N-oxide and its esters can be converted by reduction, e. g. with zinc dust in glacial acetic acid into deserpidic acid or the corresponding esters thereof which are useful intermediates for the preparation of deserpidine or analogues thereof, as disclosed in copending application Serial No. 543,574, filed October 28, 1955, by Paul Reuben Ulshafer.

The starting materials used for the preparation of the new esters are known or can be prepared by methods analogous to those used in the preparation of the known compounds. They can be obtained according to the process of copending application, Serial No. 471,519, filed November 26, 1954, by Paul Reuben Ulshafer.

The invention includes also any modification of the process which comprises using as starting material a compound obtainable as an intermediate product at any stage of the process and carrying out the remaining steps.

The following examples are intended to illustrate the invention. They are not to be construed as being limited thereon:

Example 1

640 mg. deserpidine in 30 ml. methylene dichloride are treated drop-wise with 3.62 ml. of a 0.61 N solution of perbenzoic acid in chloroform at 0° C. After 15 minutes the reaction mixture is washed with dilute ammonia, then with water, dried over sodium sulfate, evaporated to dryness and the residue crystallized from a mixture of methylene chloride and moist ethyl acetate to yield deserpidine N-oxide melting at 215–217° C. (decomp.). By adding hydrochloric acid to a methanolic solution of deserpidine N-oxide, the crystalline hydrochloride is obtained. In the same way the sulfate, nitrate, perchlorate or phosphate can be obtained.

Example 2

204 mg. of methyl O-(3,4,5-trimethoxycinnamoyl)-deserpidate in 50 ml. methylene chloride are treated drop-wise with 1.10 ml. of a 0.61 N solution of perbenzoic acid in methylene chloride at 0° C. After 15 minutes, the solution is washed with dilute aqueous ammonia, then with water, dried over sodium sulfate and concentrated to dryness. The residue is crystallized from moist ethyl acetate to yield methyl O-(3,4,5-trimethoxycinnamoyl)-deserpidate N-oxide melting at 214–216° C. (decomp.).

Example 3

31 mg. of methyl O-(3,4-dimethoxybenzoyl)-deserpidate in 5 ml. methylene chloride are treated with 0.184 ml. of a 0.61 N solution of perbenzoic acid in methylene chloride at 0° C. The reaction mixture is worked up in a manner analogous to that described in Example 2, to yield methyl O-(3,4-dimethoxybenzoyl)-deserpidate N-oxide melting at 212–213° C. (decomp.).

Example 4

56 mg. of methyl O-furoyl-(2)-deserpidate in 5 ml. methylene chloride are treated drop-wise with 0.381 ml. of a 0.615 N solution of perbenzoic acid in methylene chloride at 0° C. The reaction mixture is worked up in a manner analogous to that described in Example 2, to yield methyl O-furoyl-(2)-deserpidate N-oxide melting at 218–220° C. (decomp.).

Example 5

89 mg. of methyl O-acetyl-deserpidate in 10 ml. methylene chloride are treated drop-wise with 0.676 ml. of a 0.615 N solution of perbenzoic acid in chloroform at 0° C. The reaction mixture is worked up in a manner analogous to that described in Example 2, to yield methyl O-acetyl deserpidate N-oxide melting at 220° C. (decomp.).

Example 6

47 mg. of n-butyl O-acetyl deserpidate in 20 ml. methylene chloride are treated with 0.212 ml. of an 0.945 N solution of perbenzoic acid in methylene chloride. After washing with dilute ammonia, water and drying over sodium sulfate the solution is evaporated to dryness and the residue, n-butyl O-acetyl-deserpidate N-oxide taken up in methanol. By adding hydrochloric acid to this solution, the crystalline hydrochloride of n-butyl O-acetyl-deserpidate N-oxide, melting at 235—236° C. (decomp.) is obtained. By using sulfuric acid, nitric acid, perchloric acid or phosphoric acid instead of hydrochloric acid, the corresponding salts of n-butyl O-acetyl-deserpidate N-oxide are obtained.

Example 7

66.4 mg. of methyl O-nicotinoyl-deserpidate are treated in 20 ml. methylene chloride with 0.288 ml. of an 0.945 N solution of perbenzoic acid in methylene chloride. After 15 minutes in an ice bath the solution is washed with dilute ammonia, water, dried over sodium sulfate and concentrated to dryness. The residue is crystallized from moist ethyl acetate to afford methyl O-nicotinoyl-deserpidate N-oxide melting at 208–209° C. (decomp.).

Example 8

The esters of alkyl deserpidates mentioned in Examples 1–7 as starting materials can be obtained according to the following description, wherein the relationship of parts by weight and parts by volume is the same as that of the gram to the milliliter. 500 parts by weight of dried, finely ground roots of Rauwolfia canescens are extracted batch-wise with methanol at its boiling point, using the following volumes and times, and filtering each extract while hot: 2,000 parts by volume, 1 hour; 1,000 parts by volume, 45 minutes; 1,000 parts by volume, 30 minutes; 1,000 parts by volume, 30 minutes. The extracts are combined and evaporated in vacuo to 75 parts by volume of thick syrupy solution. After the addition of 75 parts by volume of methanol and 150 parts by volume of acetic acid of 15 percent strength with adequate mixing, the solution is extracted with 2 portions each of 100 parts by volume of hexane. The combined hexane extracts are extracted with 15 parts by volume of acetic acid of 15 percent strength. The latter extract is added to the above acetic acid phase which is then extracted with 3 portions each of 75 parts by volume and 1 portion of 50 parts by volume of ethylene chloride. The first 3 extracts are combined and washed with 60 parts by volume of 2 N sodium carbonate solution and then with 60 parts by volume of distilled water. These washing solutions are saved and used for the washing of the 4th and final ethylene chloride extract. The combined ethylene chloride extracts are dried over sodium sulfate, filtered and evaporated in vacuo to a constant weight of a tan, frothy solid. 1 part by weight of this residue is dissolved in 1.5 parts by volume of warm methanol and the solution cooled to 5° C. for 18 hours, whereby crystallization of reserpine sets in. After filtering from the crystallized reserpine and washing with cool methanol, the filtrate is freed of solvent in vacuo. 2 parts by weight of the resulting red-brown solid froth are triturated with 2 portions each of 25 parts by volume of benzene and filtered each time. The benzene insoluble material is saved for further treatment. The benzene soluble fraction is poured onto a column of 40 parts by weight of activated alumina (Woelm, activity grade I), which is then eluted first with 3 portions each of 50 parts by volume of benzene and then with 6 portions each of 50 parts by volume of benzene-acetone (9:1), the first of which benzene-acetone portions had been used for extraction of the above mentioned benzene insoluble material. The second of the 6 benzene-acetone elution fractions on removal of the solvents gives a light tan solid froth which on crystallization from methanol gives colorless prismatic needles of slightly impure deserpidine. Rechromatographing of 1 part by weight of this substance on 20 parts by weight of activated alumina (Woelm, activity grade I) using benzene and benzene containing 0.1 percent methanol as eluting agents followed by crystallization from methanol gives colorless prismatic needles of pure deserpidine, melting at 228–232° C.

To 0.5 part by weight of deserpidine is added a solution of 0.05 part by weight of sodium in 25 parts by volume of methanol. The mixture is refluxed under nitrogen for one hour during which the deserpidine all dissolves. After cooling, the solution is concentrated in vacuo to a volume of about 10 parts by volume. 30 parts by volume of water are added and then concentrated hydrochloric acid in a drop-wise manner until the solution is strongly acidic. It is then extracted with 15 parts by volume of ether and re-extracted with 3 portions each of 10 parts by volume of ether. The aqueous phase is then made basic with concentrated aqueous ammonia and extracted with 15 parts by volume of methylene chloride and re-extracted with 3 portions each of 10 parts by volume of methylene chloride. The combined methylene chloride extracts are dried over anhydrous potassium carbonate and concentrated in vacuo to give methyl deserpidate as a pale, yellow solid froth which analyzes for the empirical formula $C_{22}H_{28}O_4N_2$. In the same manner, by employing dry ethanol or butanol instead of methanol, the corresponding alkyl deserpidates are obtained.

To 1 part by weight of deserpidine in 20 parts by volume of methanol is added a solution of 2 parts by weight of potassium hydroxide in 10 parts by volume of water. This mixture is refluxed for 2 hours under an atmosphere of nitrogen. At the end of this period all the deserpidine is dissolved and the resulting solution is filtered through glass wool. After cooling, glacial acetic acid (3 parts by volume) is added to give the solution a pH of about 6. The solution is then evaporated in vacuo to a white, solid froth, which is triturated with 25 parts by volume of ether and filtered. The ether insoluble portion is similarly treated with two portions each of 25 parts by volume of ether. The white, ether-insoluble solid is triturated once with 100 parts by volume of acetone and then with 5 portions each of 50 parts by volume of acetone. After each trituration the mixture is filtered and the filtrates evaporated to dryness in vacuo. The white, solid froths thus resulting from the first four triturations are combined and crystallized from methanol, yielding white prisms, melting at 267–269° C. (decomp.). The product is recrystallized by dissolving in a large volume of methanol and methylene chloride, filtering and concentrating until a small volume of methanol remains. After two such recrystallizations deserpidic acid is obtained in the form of white prisms melting at 270–273° C. (decomp.). To a suspension of 0.75 part by weight of deserpidic acid in 50 parts by volume of methanol and 50 parts by volume of ether, cooled in an ice bath, is added in portions and with frequent swirling a cold ethereal solution of diazoethane prepared from 6 parts by volume of nitrosoethylurethane. There is a slow dissolving of the deserpidic acid, so that finally all acid is dissolved while still an excess of diazoethane is present. The solution is evaporated, first at atmospheric pressure and finally in vacuo to give ethyl deserpidate as a light tan frothy solid.

To 0.5 part by weight of ethyl deserpidate, dried by distilling toluene from it twice, in 4 parts by volume of dry, distilled pyridine, is added drop-wise and with stirring 0.5 part by weight of 3,4,5-trimethoxybenzoyl chloride in 2 parts by volume of dry benzene. 1 part by volume of dry pyridine is used as a rinse. The flask is securely stoppered and kept at 5° C. for 3 days and then at room temperature over night. The reaction mixture is poured into 50 parts by volume of water and ice. 2 parts by volume of concentrated aqueous ammonia in 10 parts by volume of water are added slowly and with stirring. After stirring for 5 minutes, the mixture is extracted three times with methylene chloride: 50 parts by volume; 15 parts by volume; 10 parts by volume. The combined methylene chloride extracts are washed with 2 portions of saturated sodium chloride solution. After drying over anhydrous potassium carbonate, the solution is filtered and evaporated in vacuo to dryness. Toluene is vacuum-distilled from the residue three times.

0.51 part by weight of the above residue is dissolved in 10 parts by volume benzene and poured onto a column of 10 parts by weight of activated alumina (Woelm; activity I), using 15 parts by volume of benzene as wash. The fractions eluted with benzene, benzene containing 0.1 percent methanol and benzene containing 0.2 percent methanol, were evaporated to dryness and the residue dissolved in methanol. Dilute nitric acid (1:4) was added to the methanolic solution, whereupon the nitric acid salt of ethyl O-(3,4,5-trimethoxybenzoyl)-deserpidate crystallizes, M. P. 255–260° C. (decomp.). It can be recrystallized from a mixture of methanol and methylene chloride by evaporating the methylene chloride; it then melts at 258–260° C. (decomp.).

0.3 part by weight of methyl deserpidate is dissolved in 2 parts by volume of dry distilled pyridine and added slowly to a cooled mixture of 0.33 part by weight of 3,4,5-trimethoxycinnamoyl chloride in 2 parts by volume of dry distilled pyridine. 1 part by volume of dry pyridine is used as a rinse. After standing at 5° C. for 4 days, the reaction mixture is poured into 20 parts by volume of water and ice. 10 parts by volume of 10 percent aqueous ammonia are added, the mixture is triturated for about 5 minutes and then extracted with three portions each of 15 parts by volume methylene chloride. The combined extracts are washed with 5 parts by volume of cold sodium chloride solution, dried over anhydrous potassium carbonate, and concentrated in vacuo to a solid residue. 0.41 part by weight of this is dissolved in 10 parts by volume of benzene and 2 parts by volume of hexane and chromatographed on 8 parts by weight activated alumina (Woelm; activity No. 1). From the fractions eluted with benzene (400 parts by volume), followed by removal of the solvent and crystallization from methanol-hexane, methyl O-(3,4,5-trimethoxycinnamoyl)-deserpidate is obtained in the form of small white plates which sinter to a glass at 133–143° C., recrystallize at 182° C. and melt at 216–217° C.

0.5 part by weight of methyl deserpidate, dried by distilling toluene under vacuum from it twice, is dissolved in 5 parts by volume of dry, freshly distilled pyridine. 0.5 part by volume of acetic anhydride is added with cooling. The reaction mixture is allowed to stand at 5° C. for 5 days, after which it is poured into 50 parts by volume of water and ice. 12 parts by volume of 5 percent aqueous ammonia are added and the mixture triturated for about 10 minutes. It is then extracted with 50 parts by volume of methylene chloride and re-extracted with 15 parts by volume and then with 10 parts by volume of the same solvent. The combined extracts are washed with 2 portions each of 10 parts by volume of a sodium chloride solution, dried over anhydrous potassium carbonate and evaporated in vacuo to give the crude methyl O-acetyl deserpidate. After crystallization from methanol, it melts at 275–278° C. and analyzes for the empirical formula $C_{24}H_{30}O_5N_2$. Its optical rotation is $[\alpha]_D^{26} = -132° \pm 1°$ (chloroform).

0.5 part by weight of methyl deserpidate, dried by distilling toluene under vacuum from it twice, is dissolved in 5 parts by volume of dry distilled pyridine. 0.5 part by volume of 2-furoyl chloride (freshly distilled) is added with cooling. The resulting precipitate is re-dissolved by the addition of 2 parts by volume of dry benzene. After standing at 5° C. for 5 days the reaction mixture is poured into 50 parts by volume water and ice. 12 parts by volume of 5 percent aqueous ammonia are added and the mixture triturated for about 10 minutes. It is then extracted with 50 parts by volume methylene chloride and re-extracted with 15 parts by volume and then with 10 parts by volume of the same solvent. The combined extracts are washed with 2 portions each of 10 parts by volume of the same solvent. The combined extracts are washed with 2 portions each of 10 parts by volume sodium chloride solution, dried over anhydrous potassium carbonate and concentrated in vacuo. 0.720 part by weight of the residue is dissolved in 15 parts by volume of dry benzene and chromatographed on 14 parts by weight activated alumina (Woelm; activity No. 1). From the fractions eluted with 200 parts by volume of benzene and with 100 parts by volume of benzene containing 0.1 percent methanol, followed by removal of the solvents and crystallization from methanol, methyl O-furoyl-(2)-deserpidate is obtained in fine, white needles, melting at 244–247° C.

To a solution of 0.5 part by weight of methyl deserpidate in 4 parts by volume of dry, distilled pyridine is added 0.5 part by weight of 3,4-dimethoxybenzoyl chloride in 2 parts by volume of benzene, drop-wise and with cooling and stirring. 1 part by volume of pyridine is used to rinse the reagent into the reaction flask which is stoppered and kept at 5° C. for 5 days. The reaction mixture is poured into 50 parts by volume of water containing ice. 2 parts by volume of concentrated aqueous ammonia in 10 parts by volume of water are added. After trituration for 5 minutes, the mixture is extracted with 3 portions of methylene chloride: 50 parts by volume, 15 parts by volume and 10 parts by volume. The combined methylene chloride extracts are washed twice with 10 parts by volume of saturated sodium chloride solution. After drying over anhydrous potassium carbonate, the solution is filtered and evaporated in vacuo to dryness. The tan solid froth is crystallized from 5 parts by volume of methanol to give crystals melting at 211–215°. This, on recrystallization from methanol after activated charcoal treatment in methanol-methylene chloride solution, gives white prisms of methyl O-(3,4-dimethoxybenzoyl)-deserpidate melting at 213–216° C.

0.3 part by weight of deserpidic acid is dissolved in 20 parts by volume of a 1:1 mixture of methylene chloride and dioxane. A solution of diazo-n-butane in ether is added drop-wise with cooling in an ice bath until nitrogen is no longer evolved and a slight orange color persists. The mixture is left standing for 24 hours at room temperature and then freed from solvents under reduced pressure. The residue is dissolved in methylene chloride and passed over a short column of 5 parts by weight of magnesium silicate (Florex). Methylene chloride containing 10 percent methanol is used as eluant. After evaporation of the solvent n-butyl deserpidate remains.

This residue is dissolved in 10 parts by volume of dry pyridine and 5 parts by volume of acetic anhydride added. After standing for four days at 5° C., the reaction is poured into water, 10 parts by volume of concentrated aqueous ammonia added and the mixture extracted four times with methylene chloride. The extracts are washed with a saturated aqueous sodium chloride solution and dried over magnesium sulfate and sodium carbonate. After evaporation there is obtained a crude residue which is purified by passing over 5 parts by weight of magnesium silicate (Florex) using methylene chloride as a solvent. The fraction eluted with methylene chloride containing 10 percent methanol yields crystalline n-butyl O-acetyl-deserpidate, M. P. 226–228° C.

To a solution of 0.90 part by weight of methyl deserpidate in 20 parts by volume of dry distilled pyridine is added 1.0 part by weight of nicotinoyl chloride. The reaction mixture is kept at 5° C. for 5 days and then poured into 100 parts by volume of water. 10 parts by volume of concentrated aqueous ammonia in 10 parts by volume of water are added and the mixture extracted three times with 30 parts by volume each of methylene chloride. The combined extracts are washed with 30 parts by volume of a saturated aqueous sodium chloride solution, dried over magnesium sulfate and anhydrous sodium carbonate, filtered and evaporated to dryness in vacuo at room temperature. The residue is chromatographed over 10 parts by weight of magnesium silicate (Florex) using about 150 parts by volume of methylene chloride for elution. After evaporation of the solvent and crystallization from benzene methyl O-nicotinoyl-deserpidate melting at 167–169° C. (decomp.) is obtained.

What is claimed is:

1. A compound selected from the group consisting of those having the general formula:

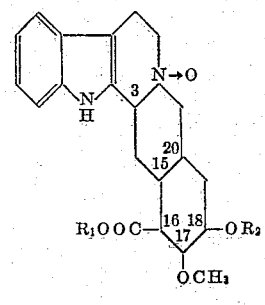

and possessing the stereoconfiguration of deserpidine in the 3-, 15- and 20-positions, wherein $R_1$ is a member selected from the group consisting of hydrogen and lower alkyl and $R_2$ is a member of the group consisting of hydrogen, lower alkanoyl, benzoyl, mono-lower alkoxy-benzoyl, di-lower alkoxy-benzoyl, tri-lower alkoxy-benzoyl, methylenedioxy-benzoyl, O-carbo-lower alkoxy-syringoyl, phenylacetyl, cinnamoyl, tri-lower alkoxy-cinnamoyl, furoyl, nicotinoyl, isonicotinoyl, and therapeutically active acid addition salts thereof.

2. Deserpidine N-oxide.
3. Methyl O-acetyl-deserpidate N-oxide.
4. Methyl O-furoyl-(2)-deserpidate N-oxide.
5. Methyl O-(3,4,5-trimethoxycinnamoyl)-deserpidate N-oxide.
6. Methyl O-nicotinoyl-deserpidate N-oxide.

7. A process which comprises the step of treating a compound having the general formula:

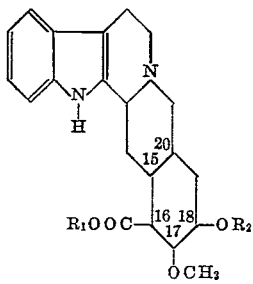

wherein $R_1$ is a member selected from the group consisting of hydrogen and lower alkyl and $R_2$ is a member of the group consisting of hydrogen, lower alkanoyl, benzoyl, mono-lower alkoxy-benzoyl, di-lower alkoxy-benzoyl, tri-lower alkoxy-benzoyl, methylenedioxy-benzoyl, O-carbo-lower alkoxy-syringoyl, phenyl-acetyl, cinnamoyl, tri-lower alkoxy-cinnamoyl, furoyl, nicotinoyl, and isonicotinoyl, and which possesses the stereoconfiguration of deserpidine in the 3-, 15- and 20-positions with about one molar equivalent of a member selected from the group consisting of hydrogen peroxide, ozone, mono-persulfuric acid, p-toluene-persulfonic acid and organic percarboxylic acids at a depressed temperature, and isolating the resulting N-oxide.

8. A process which comprises the step of treating deserpidine with about one molar equivalent of a member of the group consisting of hydrogen peroxide, ozone, mono-persulfuric acid, p-toluene-persulfonic acid and organic percarboxylic acids at a depressed temperature and isolating the resulting N-oxide.

9. A process which comprises the step of treating methyl-O-acetyl-deserpidate with about one molar equivalent of a member of the group consisting of hydrogen peroxide, ozone, mono-persulfuric acid, p-toluene-persulfonic acid and organic percarboxylic acids at a depressed temperature, and isolating the resulting N-oxide.

10. A process which comprises the step of treating methyl-O-furoyl-(2)-deserpidate with about one molar equivalent of a member of the group consisting of hydrogen peroxide, ozone, mono-persulfuric acid, p-toluene-persulfonic acid and organic percarboxylic acids at a depressed temperature, and isolating the resulting N-oxide.

11. A process which comprises the step of treating methyl-O-(3,4,5-trimethoxycinnamoyl)-deserpidate with about one molar equivalent of a member of the group consisting of hydrogen peroxide, ozone, mono-persulfuric acid, p-toluene-persulfonic acid and organic percarboxylic acids at a depressed temperature, and isolating the resulting N-oxide.

12. A process which comprises the step of treating methyl-O-nicotinoyl-deserpidate with about one molar equivalent of a member of the group consisting of hydrogen peroxide, ozone, mono-persulfuric acid, p-toluene-persulfonic acid and organic percarboxylic acids at a depressed temperature, and isolating the resulting N-oxide.

No references cited.